United States Patent [19]

Asty et al.

[11] Patent Number: 4,569,230
[45] Date of Patent: Feb. 11, 1986

[54] SELF-PROPELLED VEHICLE

[75] Inventors: Michel Asty, Versailles; Bernard Lerat, Igny; Robert Saglio, Antony; Jacky Viard, Chatillon, all of France

[73] Assignee: Commissariat a l'Energie Atomique, Paris, France

[21] Appl. No.: 512,561

[22] Filed: Jul. 11, 1983

[30] Foreign Application Priority Data

Jul. 15, 1982 [FR] France .................. 82 12380

[51] Int. Cl.⁴ ........................... G01N 29/04
[52] U.S. Cl. ..................... 73/623; 376/249; 376/252
[58] Field of Search .............. 73/623, 635, 639; 376/249, 252

[56] References Cited

U.S. PATENT DOCUMENTS 3,999,428 12/1976 Tyree ................. 73/862.45
4,131,018 12/1978 Muller et al. ............ 376/249
4,218,923 8/1980 Triplett ................. 73/623

FOREIGN PATENT DOCUMENTS

2640055 3/1978 Fed. Rep. of Germany .
2267612 11/1975 France .
0012655 6/1980 France .
1565049 4/1980 United Kingdom .

Primary Examiner—Anthony V. Ciarlante

[57] ABSTRACT

A vehicle able to move between two walls and particularly in the space between two vessels of a fast neutron reactor, for inspection and testing; the vehicle having two wheels bearing on one of the two walls and connected to the vehicle body by two longitudinal arms and two wheels bearing on the other wall and arranged symmetrically with respect to the previously mentioned wheels and connected to the vehicle body by two transverse arms. The longitudinal and transverse arms may be folded back to permit the passage of the assembly through an opening.

15 Claims, 12 Drawing Figures

SELF-PROPELLED VEHICLE

BACKGROUND OF THE INVENTION

The present invention relates to a self-propelled vehicle, which can in particular be used for inspecting the walls of nuclear reactor vessels.

In nuclear installations and more specifically in fast neutron reactors, the vessels are constituted by a double metal wall, which must be regularly inspected in order to detect any possible faults in the metal, particularly at the welds.

Vehicles have already been designed, which are able to transport inspection means, such as ultrasonic transducers and which are able to move in the space between two substantially parallel walls. The article "In Service Inspection of Main and Safety Tanks Weldments" (IAEA Specialists' Meeting on "In Service Inspection and Monitoring of LMFBRS", Bensberg May 20-23 1980) describes such a vehicle which has two driving and guide wheels bearing on one of the walls, whilst two levers secured by two springs bear against the other wall via small diameter wheels or balls. Such a vehicle has the disadvantage of being relatively heavy and, in the case where the arms are equipped with balls, the latter can leave behind marks on the walls.

SUMMARY OF THE INVENTION

The object of the present invention is to eliminate these disadvantages by proposing a lightweight vehicle, having a good stability and which eliminates the risk of marking the walls.

According to the main feature of the vehicle according to the invention, this comprises a first and a second set of two driving and guide wheels connected to the central support structure by connecting means, the assembly constituted by the wheels and the connecting means being symmetrical with respect to the longitudinal plane and a transverse plane, the latter being perpendicular to one another and perpendicular to said walls.

According to a preferred embodiment, the connecting means between the two wheels of the first set and the central structure comprise two longitudinal arms, whereof one end is joined to the central support structure, each wheel being mounted at the other end of each arm.

According to another feature of the vehicle, it comprises means enabling the two longitudinal arms to move in a longitudinal plane whilst remaining symmetrical to the transverse plane. It can also have elastic means acting on the longitudinal arms, in order to apply the corresponding wheels to one of the two walls.

According to another feature of the vehicle according to the invention, the latter comprises opening-out means able to act on the longitudinal arms in order to displace them between a working position and a retracted or rest position. In the preferred embodiment, the opening-out means of the longitudinal arms comprise an opening-out jack whilst the elastic means forming part of the opening-out means comprise a suspension jack arranged so as to transmit the movements of the opening-out jack to the longitudinal arms.

According to another feature of the invention, the connecting means between each wheel of the second set and the central support structure comprise a transverse arm, whereof one end is joined to the central support structure, the wheel being mounted at the other end of the arm. The vehicle can also have means making it possible to displace the transverse arms between a working position and a bent-up or rest position.

Advantageously, the vehicle according to the invention has locking means making it possible to lock the longitudinal and transverse arms in the working position. It is also equipped with means which, in an emergency, can unlock the longitudinal and transverse arms, said unlocking means comprising a cable able to free the locking means, if it is subject to pulling or traction action exceeding a predetermined threshold.

According to a special arrangement of the components of the vehicle, the opening-out means of the longitudinal arms are arranged so as to also act on the transverse arms, in order that the latter can be brought into the working position at the same time as the longitudinal arms and it comprises means for exciting the opening-out jack and the suspension jacks, said excitation means being arranged in such a way that the excitation of the suspension jack is only possible when the longitudinal and transverse arms are locked in the working position.

In addition, each wheel of the vehicle is actuated by an individual drive motor and means for disengaging each motor are provided.

The invention also relates to a disengageable drive device, which can be mounted on such a vehicle. According to the main feature of this drive device, which is of the type having a coupling member between a leading part and a led part, the coupling member comprises a portion which can melt under the action of heat.

Finally, this vehicle which can be used inter alia for the ultrasonic testing or inspection of metal walls is equipped with a mini-vessel filled with a liquid ensuring the acoustic coupling between the ultrasonic transducers and the wall to be inspected. Obviously, it is possible to place on said vehicle any random other inspection means requiring the placing of a device on the wall to be inspected. The vessel is supplied by a reservoir having a weighted tube mobile within said reservoir in order to take up the liquid from the lowest part thereof.

In addition, the invention also relates to a liquid reservoir, which can be mounted on such a vehicle. This reservoir is characterized by the presence of a mobile tube, whose end used for sucking up the liquid is weighted, so that it can always remove the liquid from the lowest part of the reservoir.

BRIEF DESCRIPTION OF THE DRAWINGS

The invention is described in greater detail hereinafter relative to non-limitative embodiments and the attached drawings, wherein.

DETAILED DESCRIPTION OF THE INVENTION

Figure 1:
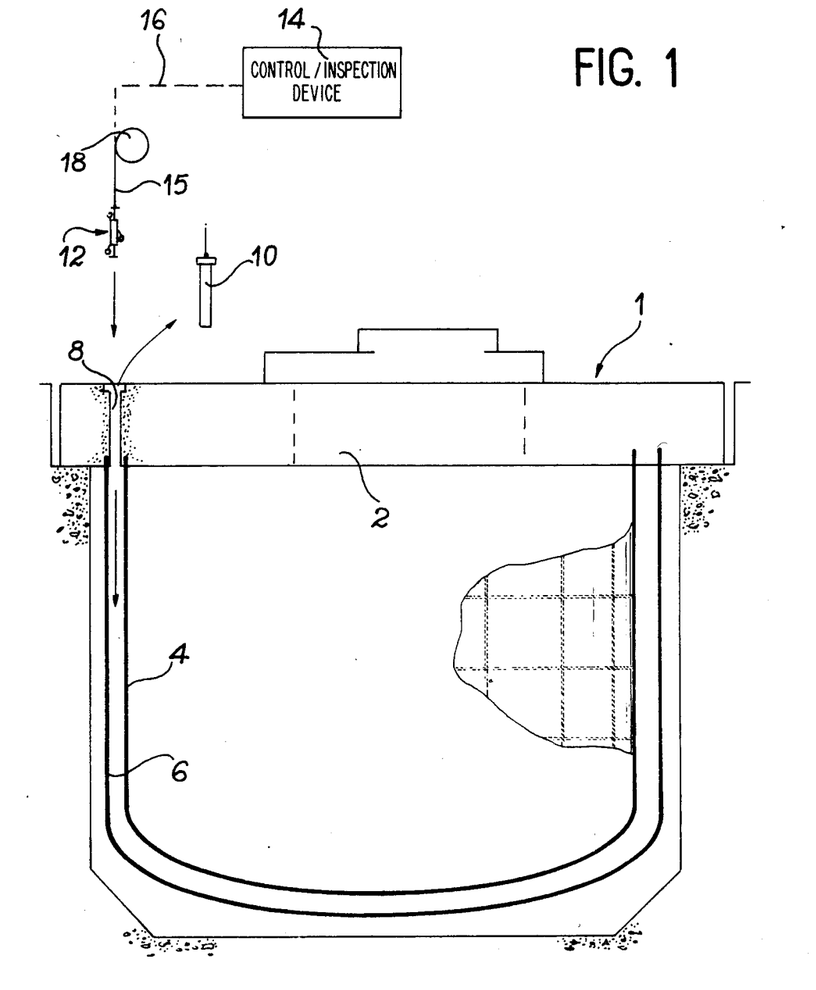
FIG. 1 is a diagrammatic sectional view of a double-walled reactor vessel, the vehicle according to the invention having to move between the two walls.

FIG. 1 shows a nuclear reactor vessel 1, sealed in its upper part by a concrete slab 2 and defined by a double wall constituted by an inner wall 4 and an outer wall 6. The latter are generally manufactured from welded metal parts, so that it is necessary to inspect their state, particularly at the welds, by inspection means, such as ultrasonics. For this purpose, the slab 2 contains a certain number of openings 8, which are sealed by plugs 10. When it is wished to inspect walls 4 and 6, plug 10 is removed and the vehicle according to the invention, represented diagrammatically at 12 in the drawing, is introduced into the opening 8. All the wires and ducts used for supplying the vehicle with power or information necessary for its operation are brought together in an umbilical cord 15. In view of the large number of equipments to be supplied the weight of the umbilical cord is relatively high compared with that of the vehicle. In addition, in order to minimize the stresses and loads applied to the actual vehicle, the umbilical cord is wound round a winch 18, whilst a group of wires and ducts, represented diagrammatically by the broken line 16, connects it to a control and inspection device 14.

Figures 2, 2A:
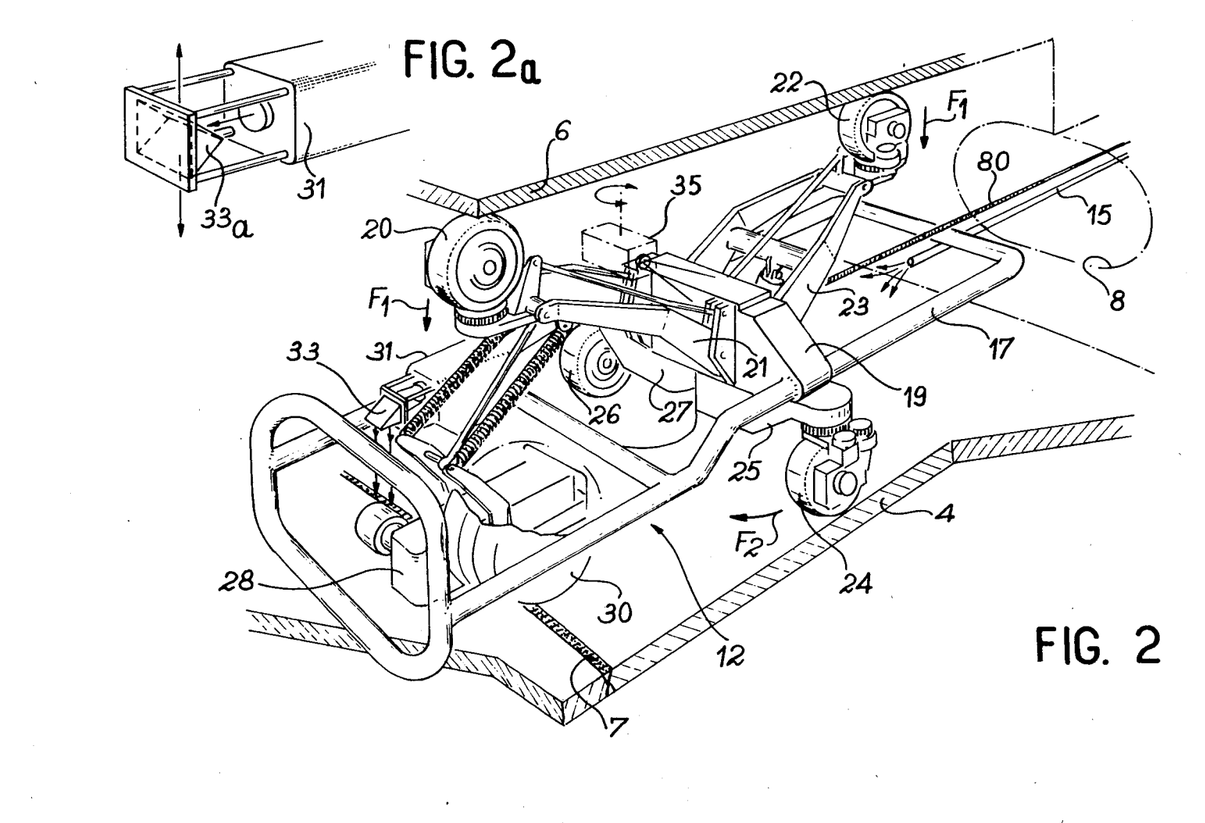
FIG. 2 is a diagrammatic perspective view of the vehicle according to the invention.
FIG. 2a is a diagrammatic view illustrating a special fixture of one of the cameras equipping the vehicle of FIG. 2.

The perspective view of FIG. 2 shows the complete vehicle 12 introduced into the space between walls 4 and 6 of the vessel through opening 8. This vehicle essentially comprises a central support structure 19, which is able to support a chassis 17 and to which are connected two pairs of two wheels, each wheel being both a guide wheel and a driving wheel. The first set consists of the two wheels 20 and 22, which can bear on wall 6 and are connected to the central structure 19 by longitudinal arms 21 and 23 respectively. The second set consists of wheels 24 and 26 bearing on the other wall 4 and connected to the central structure by transverse arms 25 and 27 respectively. The vehicle also carries a mini-vessel 28 containing the liquid for ensuring the acoustic coupling between the wall 4 to be inspected and the ultrasonic transducers carried by the vehicle, said mini-vessel being associated with a reservoir or tank 30 for the said liquid. The drawing shows that the mini-vessel 28 overhangs with respect to the central structure 19. The object of this arrangement is to make it possible to inspect the maximum possible surface portion of wall 4, even in areas made inaccessible due to the overall dimensions of the vehicle, when the longitudinal and transverse arms are opened-out into the working position. Mini-vessel 28 is fixed to the remainder of the vehicle by means, which will be described in greater detail hereinafter relative to FIG. 3.

FIG. 2 shows the vehicle in the working position, in which arms 21 and 23 are raised, in order that wheels 20 and 22 bear against wall 6, whilst arms 25 and 27 are moved away in the transverse direction. In this position, the dimensions of the vehicle exceed those of opening 8. In order to facilitate the introduction of the vehicle into the space between the walls, as well as the extraction therefrom, devices are provided which will be described hereinafter, which make it possible on the one hand to lower arms 21 and 23 in the direction of arrows $F_1$, and on the other hand to bring the transverse arms 25 and 27 towards the centre of the vehicle in the direction of arrow $F_2$.

It can be seen that in the working position, longitudinal arms 21, 23 are located in a plane perpendicular to walls 4, 6, called the "longitudinal plane" and remain in this plane, when they are brought towards the vehicle body. In addition, arms 21, 23 are rendered integral with one another in order that they remain completely symmetrical with respect to another plane, called the "transverse plane", which is perpendicular to the first, as well as to walls 4 and 6 and which contains the transverse arms when the latter are in the working position shown in the drawing. The opening-out means of the different arms, which will be described hereinafter, are arranged in such a way that the latter are constantly symmetrical with respect to the longitudinal plane. Thus, the movements of the transverse arms are simultaneous, so that the assembly constituted by the two sets of wheels and their connecting arms remain constantly symmetrical with respect to the longitudinal plane and, when the vehicle is in the working position, with respect to the transverse plane.

Moreover, the dimensions of the transverse arms have been designed so that, in the opened-out position, the distance between wheels 24 and 26 exceeds the gap between the two walls. Thus, there is no risk of the vehicle turning round by pivoting about its longitudinal axis.

As can also be seen in FIG. 2, the vehicle is equipped with two cameras. The first camera placed at the front is an inspection camera 31, equipped with a prism 33 which, in the case of FIG. 2, is disposed so as to permit the observation of the weld seam 7 of FIG. 2. FIG. 2a illustrates another arrangement in which the prism 33a is shaped in such a way that it permits the observation of the two walls simultaneously. Thus, for example, it is possible to simultaneously observe a weld seam on one of the walls and a corresponding mark made on the other wall. The other camera is a navigation camera 35, which can pivot about an axis perpendicular to walls 4, 6 and which is used for controlling the displacements of the vehicle between the two walls.

Finally, to the rear of the vehicle, it is possible to see the umbilical cord 15 containing the power supply wires for the motors, the gas supply conduits for the jacks, the coupling liquid supply for the ultrasonic transducers, etc, as well as a pulling or traction cable or rope 80 used for unlocking the longitudinal and transverse arms in the case of an emergency and for bringing the vehicle to the outside. The operation of the unlocking system will be described hereinafter relative to FIG. 7.

The operation of the means for opening-out the different arms will now be described. On referring to the diagrammatic elevation of FIG. 3, it can be seen that the opening-out means 32, mounted on the central structure 19 of the vehicle, simultaneously act on several groups of components. Firstly, they make it possible to raise the longitudinal arm 23 (arrow 29), in order to pass it from the inoperative position 23a (shown in mixed lines), to the working position 23 (shown in continuous lines). During this movement, arm 23 pivots about a spindle 34, fixed with respect to the vehicle, and as its end opposite to wheel 22 carries a toothed sector 36, which engages on an identical toothed sector 37 at the corresponding end of arm 21, it is clear that by acting on arm 23 only, it is simultaneously possible to manipulate arm 21.

This is also shown in continuous line form in its working position. It can be seen how it is connected to mini-vessel 28. The connection is ensured by a pantograph 39, whilst two springs 43, 43a ensure the placing of mini-vessel 28 against wall 4, when arm 21 bears against the other wall 6. In addition, mini-vessel 28 is connected to chassis 17 by an intermediate part 38, which rotates about a spindle 40 carried by the vehicle. Finally, a cable 41 connects part 38 to opening-out means 32, as will be described hereinafter relative to FIGS. 4 and 5.

Figure 3:
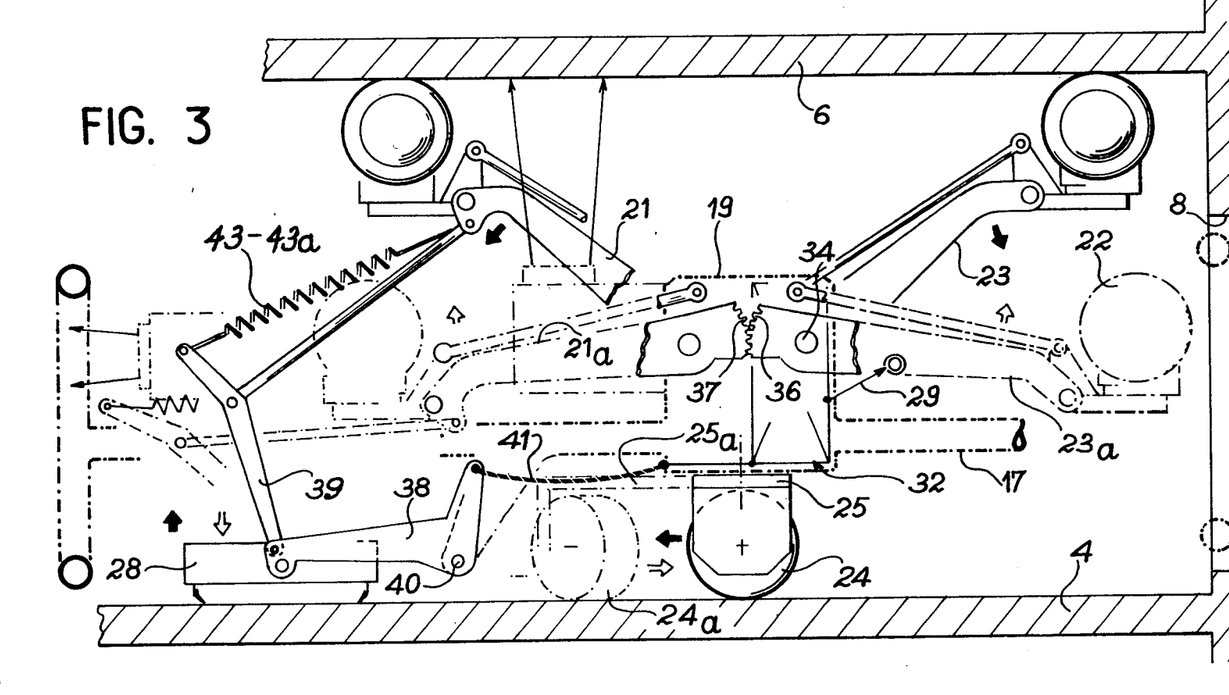
FIG. 3 is a diagrammatic elevation and part sectional view of the vehicle placed between two walls.

The opening-out means 32 also act on the transverse arms. The drawing shows arm 25 and wheel 24 in the bent-up or folded position (25a, 24a mixed lines) and in the working position (continuous lines).

Figure 4A:
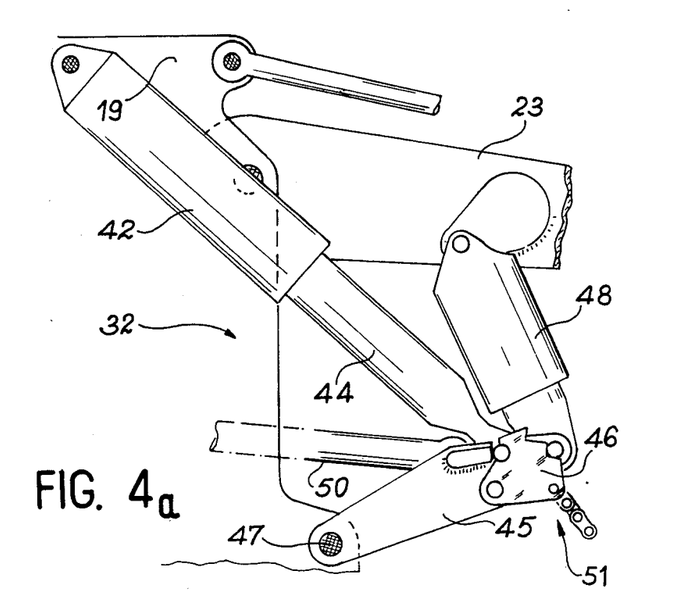
FIGS. 4a and 4b are diagrammatic elevations of the opening-out means of the longitudinal arms, respectively in the retracted position and in the working position.
Figure 4B:
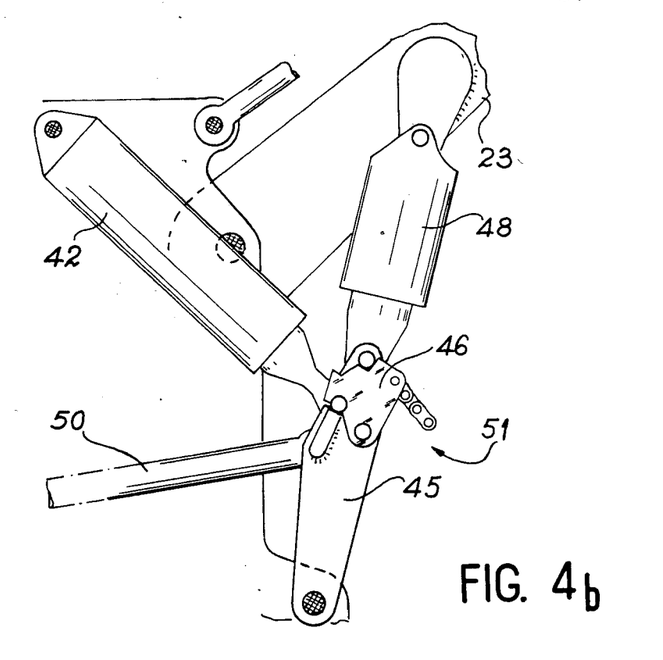

The construction of the opening-out means 32 is illustrated in FIGS. 4a and 4b. In FIG. 4a, it can be seen that this assembly essentially comprises an opening-out jack 42 fixed to vehicle structure 19 and within which can slide a rod 44. The end of the latter opposite to the jack body actuates a joint 51, to which several parts are connected. Firstly, rod 44 acts via a latch 46, whose function will be described hereinafter, on a connecting part 45, which moves around a spindle 47 fixed to the central structure 19. Part 45 on the one hand acts on a suspension jack 48 connected to arm 23, and on the other hand acts on a bar 50, which is able to control the movements of the transverse arms.

FIG. 4a shows the assembly in the inoperative position. When jack rod 44 is retracted, part 45 tilts up to the working position shown in FIG. 4b. Suspension jack 48 has moved arm 23 upwards and bar 50 has been moved to the left in the drawing. During this movement, the assembly constituted by part 45 and jack 48 has overcome a staying point, which ensures the maintaining of arm 23 in the opened-out position. A certain force must be exerted with jack 42 in order to again overcome this staying point, when it is wished to bring arm 23 into the inoperative position.

Jack 48 also plays a part in the suspension of the assembly, in order to engage wheels 20, 22, equipping arms 21, 23, with wall 6. A not shown gas distributor ensures the supply of jacks 42 and 48, but it is arranged in such a way that the supply of jack 48 only takes place when jack 42 is in the position of FIG. 4b.

Figure 5:
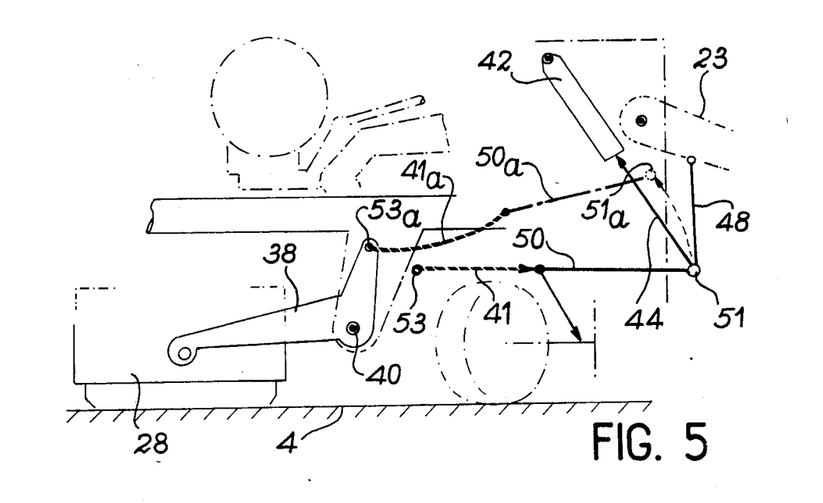
FIG. 5 is a diagrammatic elevation illustrating the action of these opening-out means on the transverse arms, as well as on the mini-vessel containing the inspection means coupling liquid.

FIG. 5 summarizes the different functions of the opening-out means 32. On exciting or energizing jack 42, rod 44 brings joint 51 into a position 51a and jack 48 moves arm 23 upwards and bar 50 assumes a position 50a. Cable 41 connects the end of bar 50 to an attachment point 53 to part 38. During the opening-out of the longitudinal and transverse arms, cable 41 is released and it is arm 21, via pantograph 39, which applies the mini-vessel 28 to vessel 4 (FIG. 3). When bar 50 returns to the inoperative position, it makes cable 41 taut. The latter passes from position 41a to position 41, thus contributing to the raising of mini-vessel 28 by the rotation of part 38.

Figure 6:
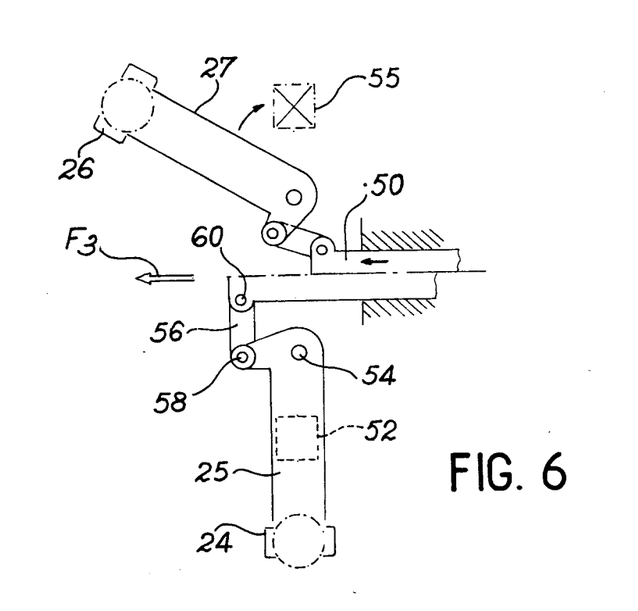
FIG. 6 is a plan view showing how it is possible for two transverse arms to move between the working position and the bent-up position.

Bar 50 also acts on the transverse arms 25 and 27, as is illustrated by the plan view of FIG. 6, which shows arm 25 in the working position and arm 27 in the bent-up position. It can be seen that arm 25 moves around a fixed spindle 54 and that its end opposite to wheel 24 is connected to bar 50 by means of a link 56, articulated to two spindles 58 and 60. When bar 50 is moved in the direction of arrow F₃, arm 25 pivots around spindle 54 and enters the position shown in the drawing, where it is stopped by a stop 52, whilst arm 27 is stopped by stop 55. If bar 50 is displaced in the opposite direction, the arm pivots in the opposite direction and enters the position symmetrical of that shown for arm 27.

Figure 7:
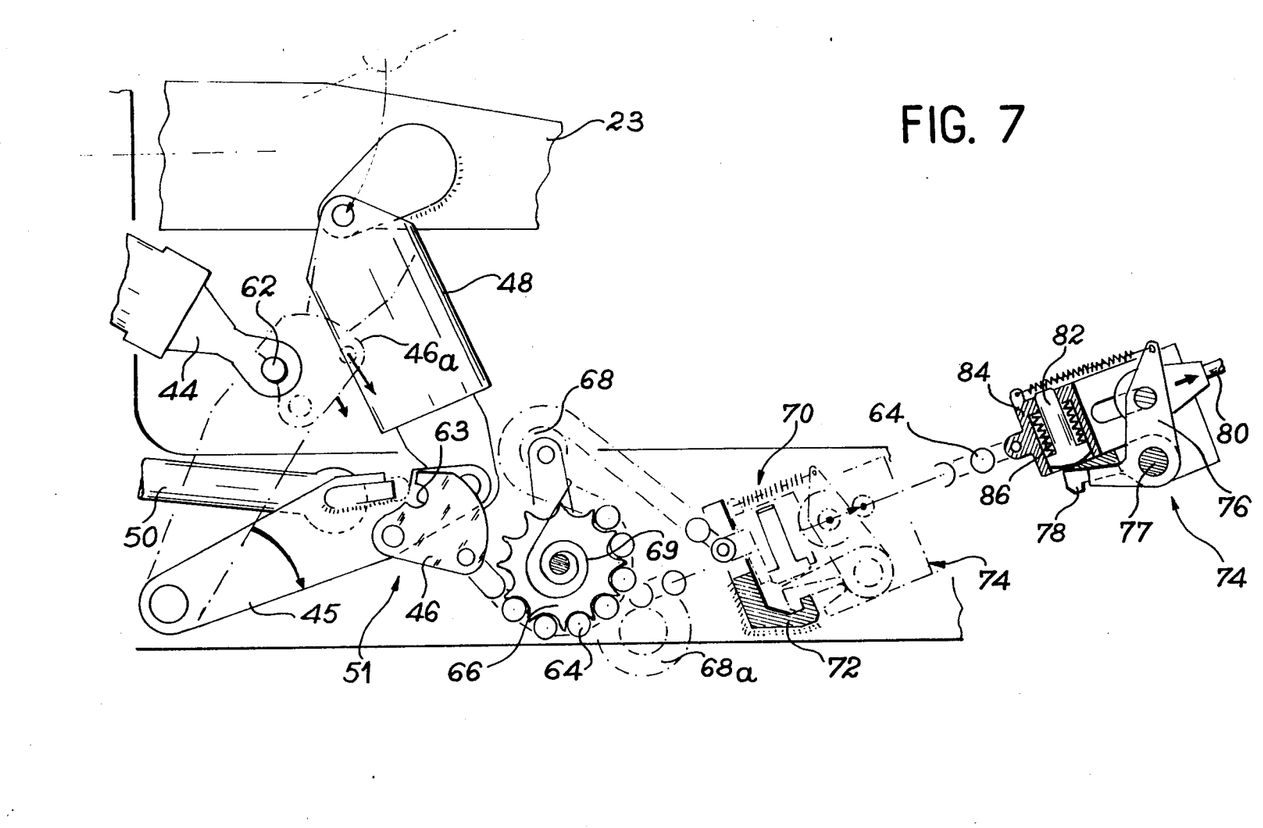
FIG. 7 is a diagrammatic elevation and part sectional view of the unlocking device and the opening-out means.

In view of the fact that an operating incident is always possible, it is necessary to provide an unlocking device, which can bring the longitudinal and transverse arms along the vehicle body, even if the opening-out jack jams. This device is shown in FIG. 7, where it is possible to see the end of the jack rod 44 separated from part 45 after unlocking. In the normal operating mode, rod 44 is connected to latch 46 by a pin 62, which enters a slot 63, the movements of rod 44 being transmitted to part 45 by latch 46.

A chain 64, whereof a first end is fixed to latch 46, is wound around a rack wheel 66 and then onto a pinion 68, whilst its other end is fixed to the actual unlocking system 70. The latter has a locking bush or clip 72 fixed to the vehicle body and a mobile part, shown in broken lines in the normal position and in continuous lines to the right of the drawing after unlocking. The mobile part 74 comprises a connecting part 76, which moves around a spindle 77 carried by mobile part 74, and whereof one end has a member 78 which, in the normal position, is locked by locking bush 72, thus preventing any displacement of part 74. Pulling on cable 80 makes it possible to free member 78 by the rotation of part 76, but this movement is impeded by a part 82 maintained in recess 84 by a stack of elastic washers 86. Thus, the movement only takes place if a pulling or traction action exceeding a certain threshold is exerted on the cable and which prevents untimely unlocking.

In the case of extraction made necessary by an incident on the vehicle, cable 80 is pulled until member 78 is freed from latch 72 and mobile part 74 is moved to the right of the drawing. This has the effect of making chain 64 taut, said chain being fixed to the mobile part and pinion 68 passes into a position 68a. Due to the tension of the chain, latch 46 is moved from its working position 46a, shown by broken lines, to its lower position, shown in continuous lines, pin 62 being disengaged from slot 63. During this movement, latch 46 has moved part 45 which, in turn, has brought jack 48 and bar 50 into their inoperative position corresponding to FIG. 4a. The longitudinal and transverse arms, as well as the mini-vessel 28 have consequently automatically been brought into the inoperative position. In this case, a special device is introduced, which grips the chassis in order to prevent an accidental turning round or over of the vehicle. Thus, the latter can be extracted from the space between the two walls through opening 8, by pulling on cable 80. The necessary interventions or repairs are carried out and when the vehicle is put back into service, pinion 68 is brought into its normal position and pin 62 is placed back in slot 63.

Figure 8:
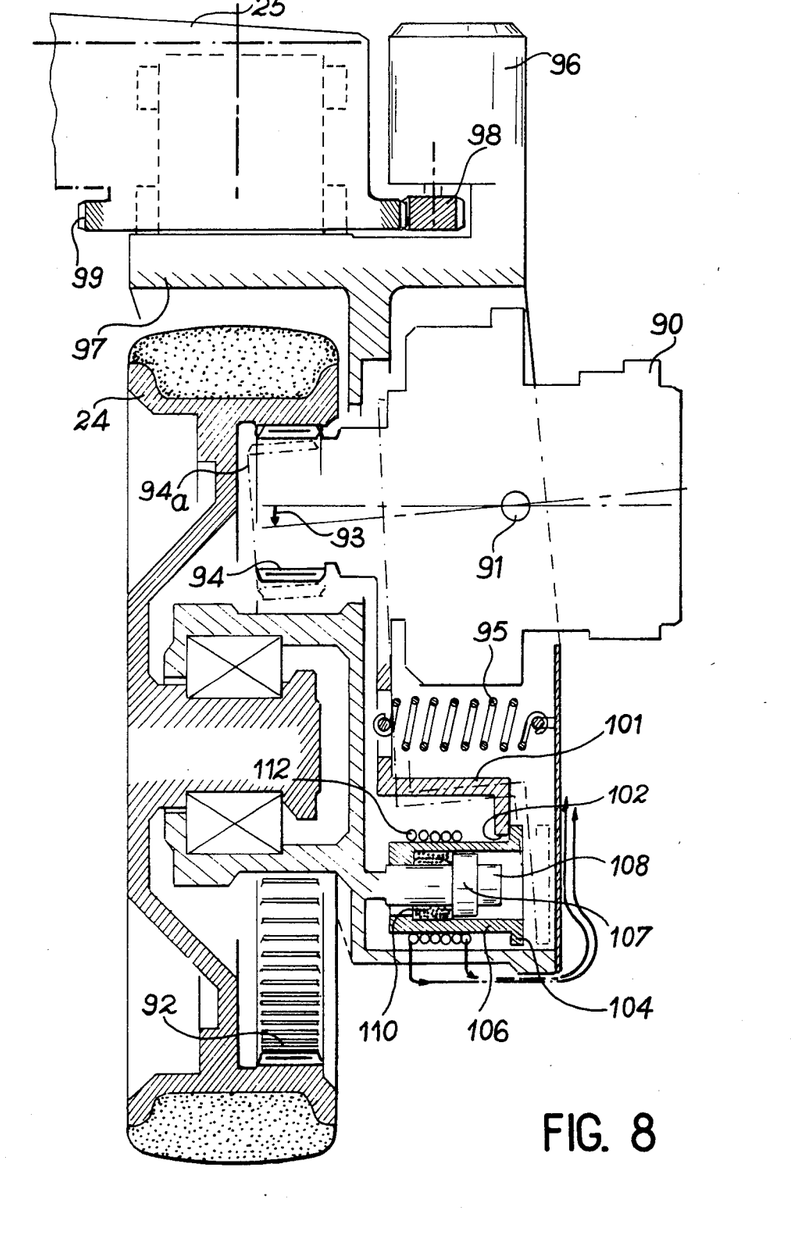
FIG. 8 is a diagrammatic sectional view of the means for driving a wheel of the vehicle in a diametral plane of the wheel.

Another safety device has been provided for the drive motors associated with each wheel, which permits the disengagement thereof in the case of a breakdown. Such a device is illustrated in the sectional view of FIG.

8, where it is possible to see wheel 24 driven by a motor 90 acting on a spur ring 92, integral with wheel 24, via a pinion 94. A second motor 96, called the rotation motor, is integral with support 97 of wheel 24 and drives a pinion 99, which meshes with a rack wheel 99, integral with transverse arm 25. Thus, by acting on motor 96, it is possible to orient the plane of wheel 24 relative to arm 25.

Motor 90 rotates about a spindle 91 and is moved in the direction of arrow 93 by a spring 95, which acts on an arm 101 integral with motor 90. However, end 102 of arm 101 abuts against the edge 104 of a cylindrical part 106, which moves along another cylindrical part 108, positioned within part 106 and coaxially with respect to the latter. However, this movement is prevented by the presence of a fusible alloy 110, which is solid at the normal operating temperature and abuts against a shoulder 107 of part 108. For example, the fusible alloy 110 can be a tin or lead alloy, but any other random alloy can be used, provided it melts easily under the action of heat and that it is solid and relatively free from flow or creep at the operating temperature.

If it is wished to disengage motor 90, an electric current is passed into a resistor 112 surrounding part 106. Alloy 110 melts and part 106 can slide along part 108 under the action of arm 101 and spring 95. Motor 90 then pivots about spindle 91 and pinion 94 is disengaged from the spur ring 92 and comes into position 94a, shown by broken lines in the drawing. Obviously, a similar device is provided for each of the three other wheels.

Figure 9:
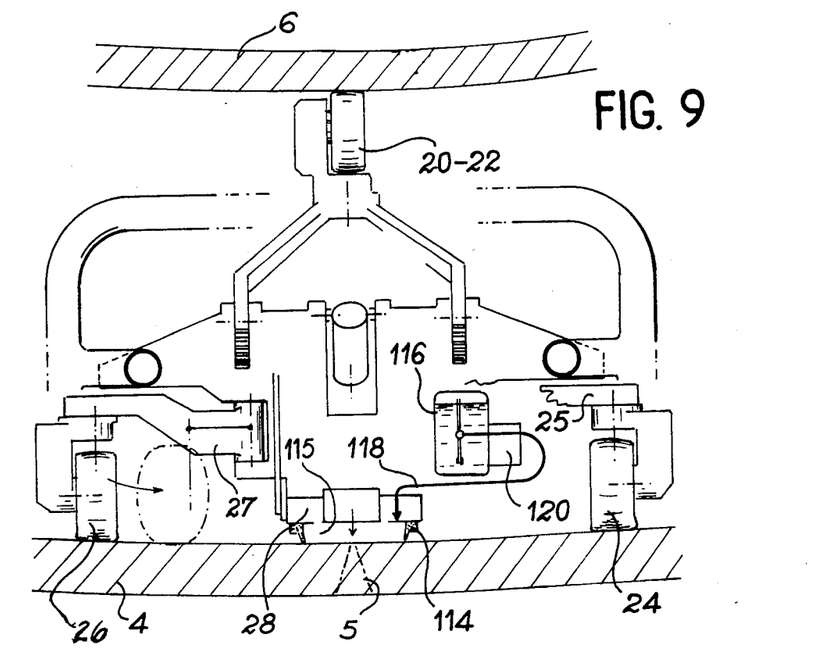
FIG. 9 is a diagrammatic elevation of the front part of the vehicle.
Figure 10:
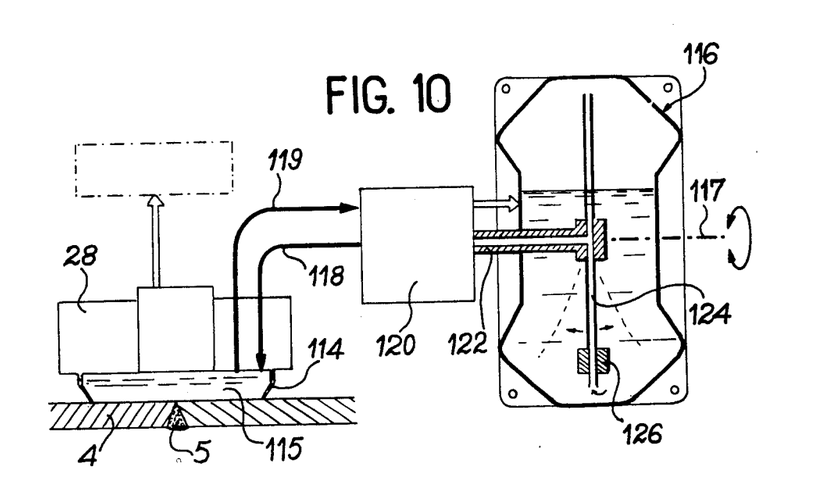
FIG. 10 a diagrammatic view showing the mini-vessel mounted on the vehicle associated with a coupling liquid reservoir.

Another special feature of the invention relates to the means for supplying coupling liquid to the mini-vessel supporting the ultrasonic transducers, said arrangement being shown in FIGS. 9 and 10.

FIG. 9 is an elevation of the front part of the vehicle, showing the latter moving along a weld seam 5 on wall 4. It is possible to see the front frame of the chassis, as well as wheels 24, 26 bearing on wall 4, whilst wheels 20, 22 bear on wall 6. In the case of FIG. 9, the vehicle moves along the weld seam 5, which is parallel to its longitudinal plane and perpendicular to the plane of the drawing, the ultrasonic transducers performing a reciprocating movement enabling them to inspect the area of the wall in the vicinity of the weld 5. However, other movements are possible. On again referring to FIG. 2, it can be seen that the mini-vessel 28 is positioned above a weld seam 7, which is perpendicular to the longitudinal plane of the vehicle. In this case, the motors for rotating the wheels are actuated in such a way as to pivot them by 90° and the vehicle performs a crablike movement along seam 7. Obviously, the ultrasonic transducers are fitted in such a way that they can carry out a scan perpendicular to seam 7.

FIG. 9 shows that the mini-vessel 28 is equipped with a lipped joint 114 defining a space 115 in which is maintained the coupling liquid. It is supplied by a reservoir 116 by means of a pipe 118 and a pump 120.

These components can best be seen in FIG. 10, where it is possible to see pump 120 connected to the mini-vessel 28 by a supply pipe 118 and a return pipe 119. The reservoir 116 is essentially cylindrical and its axis 117 is contained in the plane of the drawing. Pump 120 is connected by a hose 122 to the central part of a tube 124 located within reservoir 116. The length of tube 124 is essentially the same as the diameter of reservoir 116 and it is mounted so that it can pivot both about axis 117 and a second axis perpendicular to the latter. One of the ends of tube 124 is provided with a counterweight 126. Thus, no matter what the position of reservoir 116, the end of tube 124 carrying counterweight 126 is always in the lowest part of the reservoir and it is possible to suck up the liquid no matter what the vehicle position and even if the quantity of liquid is small. Obviously, the reservoir 116 has a certain number of devices necessary for its operation (e.g. venting system), which are known and are not shown in the drawing for reasons of clarity.

Thus, the vehicle according to the invention has numerous advantages, the main advantage being its lightness due to the central support structure, which takes up the bearing stresses of the wheels on the walls. It also has a good stability, due to the two sets of wheels placed in perpendicular planes and there is no marking of the walls, because all the wheels have flexible tyres. Finally, safety is increased for several reasons. Firstly, the dimensions of the vehicle in the opened-out position are such that no turning-over is possible between the walls. Furthermore, even if an opening-out jack 42 is no longer supplied, the longitudinal arms remain out, due to the existence of the staying point referred to hereinbefore. Finally, in the case of an operating incident, the arms can be brought into the inoperative position as a result of the unlocking system and it is possible to extract the vehicle by pulling on a cable.

Obviously, the invention is not limited to the embodiment described and in fact numerous variants are possible without passing beyond the scope of the invention. For example, although in the above-described embodiment, the four wheels are both guiding and driving wheels, variants can be conceived in which certain of these walls will not be driving or will not be guiding.

Finally, the applications of this vehicle are not limited to the inspection of double-walled nuclear reactor vessels. Thus, such a vehicle can be used in all applications, where it is necessary to introduce random equipment into a space between two substantially parallel walls.

What is claimed is:

1. A light self-propelled vehicle for transporting inspection means between a first wall and a second wall, said vehicle comprising:
   a central support structure,
   two longitudinal arms having a first end connected to said central support structure and a second end,
   a first set of two drive and guide wheels, each wheel being mounted at said second end of one longitudinal arm,
   two transverse arms having a first end connected to said central support structure and a second end,
   a second set of two drive and guide wheels, each wheel being mounted at said second end of one transverse arm,
   said longitudinal and transverse arms being movable between a rest position and a working position,
   in the working position, said vehicle bearing on the first wall by means of the first set of wheels and being in contact with the second wall by means of the second set of wheels, the assembly constituted by the wheels of the first set and the longitudinal arms being perpendicular to the assembly constituted by the wheels of the second set and the transverse arms, the four wheels being at the apexes of a tetrahedron, said vehicle further comprising a single mechanism for simultaneously moving the longitudinal and transverse arms from the rest position to the working position and bringing said inspection means in contact with one of said walls.

2. A vehicle as claimed in claim 1, wherein said longitudinal arms are movable simultaneously while remaining in a longitudinal plane of said vehicle and remaining symmetrical of each other with respect to a transverse plane of said vehicle, said transverse plane being perpendicular to said longitudinal plane, and the transverse arms being movable simultaneously in a third plane perpendicular to said longitudinal and transverse planes while remaining symmetrical of each other with respect to said longitudinal plane.

3. A vehicle as claimed in claim 1, wherein said mechanism for simultaneously moving the longitudinal and transverse arms from the rest position to the working position and bringing said inspection means in contact with one of said walls comprise:
 a jack having a first end connected to said central support structure and a second end connected to a movable latch,
 connecting means for connecting said latch with one of the longitudinal arms,
 connecting means for connecting said latch with each of the transverse arms,
 connecting means for connecting said latch with said inspection means, and
 means for one of the longitudinal arms to drive the other one.

4. A vehicle as claimed in claim 3, wherein said connecting means for connecting said latch with one of the longitudinal arms comprises a suspension jack having a first end connected to said latch and a second end connected to said one of the longitudinal arms.

5. A vehicle as claimed in claim 3, wherein said means for one of the longitudinal arms to drive the other one comprises a toothed sector provided on said one of the longitudinal arms and cooperating with an identical toothed sector provided on said one of the longitudinal arms and cooperating with an identical toothed sector provided on the other longitudinal arm.

6. A vehicle as claimed in claim 3, wherein said connecting means for connecting said latch with each of the transverse arms comprise:
 a bar having a first end connected to said latch and a second end, and
 a link having a first end pivotally connected to said second end of said bar and a second end pivotally connected to each of said transverse arms.

7. A vehicle as claimed in claim 3, wherein said connecting means for connecting said latch with said inspection means comprise:
 a bar having one end connected to said latch and a second end,
 a cable having a first end fixed to said second end of said bar and a second end fixed to a pivoting part which supports said inspection means, and
 a pantograph connecting said inspection means to one of the longitudinal arms.

8. A vehicle as claimed in claim 3, further comprising locking means for locking the longitudinal and transverse arms in the working position.

9. A vehicle as claimed in claim 8, further comprising means for unlocking the longitudinal and transverse arms.

10. A vehicle as claimed in claim 9, wherein the unlocking means comprise a cable which frees the locking means when subject to a traction force exceeding a predetermined threshold.

11. A vehicle as claimed in claim 3, further comprising a traction motor mounted on each of said wheels, each motor being provided with disengaging means.

12. A vehicle as claimed in claim 11, wherein said disengaging means comprises a coupling member between a leading part and a led part, said coupling member comprising a piece which melts under the action of heat.

13. A vehicle as claimed in claim 3, wherein said inspection means comprise a ultrasonic transducer and a mini-vessel equipped with a lipped joint defining a space containing a coupling liquid.

14. A vehicle as claimed in claim 13, comprising a reservoir for the coupling liquid, said reservoir comprising a weighted tube movable within said reservoir to remove liquid from a lowest part thereof.

15. A vehicle according to claim 14, wherein said reservoir comprises a mobile tube having an end used for sucking up the liquid, said end being weighted to permit always removal of liquid from the lowest part of the reservoir.

* * * * *